(12) United States Patent
Schultz et al.

(10) Patent No.: US 11,875,502 B2
(45) Date of Patent: Jan. 16, 2024

(54) PRODUCTION-SPEED COMPONENT INSPECTION SYSTEM AND METHOD

(71) Applicant: Ford Global Technologies, LLC, Dearborn, MI (US)

(72) Inventors: Brodie Schultz, Ferndale, MI (US); Elizabeth Bullard, Royal Oak, MI (US); Francis Maslar, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 17/225,403

(22) Filed: Apr. 8, 2021

(65) Prior Publication Data

US 2022/0327688 A1 Oct. 13, 2022

(51) Int. Cl.
*G06T 7/11* (2017.01)
*G06T 7/00* (2017.01)
*G06T 17/20* (2006.01)
*G06F 30/15* (2020.01)
*G06N 3/08* (2023.01)
*G06F 30/23* (2020.01)
*G06F 119/18* (2020.01)

(52) U.S. Cl.
CPC ............ *G06T 7/0008* (2013.01); *G06F 30/15* (2020.01); *G06F 30/23* (2020.01); *G06N 3/08* (2013.01); *G06T 7/001* (2013.01); *G06T 17/20* (2013.01); *G06F 2119/18* (2020.01); *G06T 2207/20081* (2013.01); *G06T 2207/20084* (2013.01); *G06T 2207/30164* (2013.01)

(58) Field of Classification Search
CPC ....... G06T 19/20; G06T 19/003; G06T 5/002; G06T 11/60; G06T 9/00; G06T 15/04; G06T 17/30; G06F 17/241; B64C 39/024; H04W 4/023; G08G 5/0069
See application file for complete search history.

(56) References Cited

U.S. PATENT DOCUMENTS

| 2017/0247108 | A1* | 8/2017 | Ljubuncic ............. G06V 20/17 |
| 2019/0236772 | A1 | 8/2019 | Cho et al. |
| 2201/9023677 | | 8/2019 | Cho et al. |
| 2022/0027823 | A1* | 1/2022 | Singh ............... G06Q 10/06311 |

FOREIGN PATENT DOCUMENTS

| CN | 105069807 | 3/2018 |
| CN | 111462120 | 7/2020 |

* cited by examiner

*Primary Examiner* — Phuoc H Doan
(74) *Attorney, Agent, or Firm* — Burris Law, PLLC

(57) ABSTRACT

A component inspection system and method generate a 3D model based on a point cloud and images of an automotive component captured by an imaging system. It is determined whether an anomaly is present based on artificial intelligence driven training and learning. Upon anomaly detection, a type of anomaly is identified and classified. From the 3D model, a type of the automotive component can be identified. The identification of the automotive component and the anomaly detection involve a controller subject to artificial intelligence driven training and learning. The controller determines presence of anomaly and a location of anomaly if any.

16 Claims, 6 Drawing Sheets

3D Point Cloud

PRODUCTION-SPEED COMPONENT INSPECTION SYSTEM AND METHOD

FIELD

The present disclosure relates to a production-speed component inspection system and method.

BACKGROUND

The statements in this section merely provide background information related to the present disclosure and may not constitute prior art.

Automotive manufacturing involves inspection of faulty components. For instance, in stamping, defect detection relies on manual inspection of a panel, first at a high-level review by an operator moving parts from the end of a line conveyor to a shipping rack. A trained quality representative pulls panels at random from the line for an in-depth review of critical points. An inspector is expected to notify an area supervisor when a defect is identified.

It may be challenging for an inspector, especially when the same inspector is in charge of moving parts into the shipping rack, to keep up with production speed at which their base task is accomplished. Factors such as the repetitiveness of this task, and the amount of area that must be evaluated on the part, while it is being moved to the rack, may add more challenges. These and other issues related to inspecting parts are addressed by the present disclosure.

SUMMARY

This section provides a general summary of the disclosure and is not a comprehensive disclosure of its full scope or all of its features.

In one form, the present disclosure is directed towards an inspection system for automotive components that includes one or more multi-dimensional cameras configured to collect images corresponding to a selected automotive component, a network of three-dimensional (3D) scanners configured to scan the selected automotive component, and a conveyor structure operable to transport the selected automotive component. The inspection system further includes a controller communicably coupled to the cameras and the network of 3D scanners to receive the images from the cameras and receive a data set that collectively represent the structure of the selected automotive component from the network of 3D scanners, where each data of the data set corresponds to a point image of the selected automotive component. The network of 3D scanners includes a first group of scanners having a first angle and a first orientation relative to the conveyor structure and a second group of scanners having a second angle and a second orientation relative to the conveyor structure and different from the first angle and the first orientation, and within each group. The multi-dimensional cameras are arranged relative to the network of 3D scanners, the conveyor structure, and the selected automotive component. The controller is configured to (i) reconstruct a 3D model of the selected automotive component based on the image data from the cameras and the data set from the network of 3D scanners, (ii) determine whether an anomaly is present with respect to the selected automotive component based on a comparison of the reconstructed 3D model of the selected automotive component with a prestored model associated with the selected automotive component or based on an artificial intelligence based recognition, and (iii) generate, at a production speed, an output indicative of the selected automotive component with or without anomaly.

In at least one variant, the controller is configured to (i) identify, in the 3D model, the selected automotive component via an artificial intelligence classification, (ii) distinguish, in the 3D model, features associated with the selected automotive component over surrounding features unrelated to the selected automotive component, and (ii) isolate, in the 3D model, the distinguished features to acquire a component 3D model of the selected automotive component from the surrounding features.

In another variant, the controller is further configured to, upon detection of the anomaly, identify a location of the anomaly at the production speed by mapping to an original component coordinate system of the prestored model.

In further another variant, the controller is further configured to identify a classification of the anomaly via an artificial intelligence based training.

In some form, the controller is further configured to display the selected automotive component having anomaly with a location of the anomaly on a user interface at the production speed.

In another form, the 3D scanners are automatically synchronized within microseconds, and after a geometric calibration of extrinsic parameters of the network of the 3D scanners, the controller receives the data set from the 3D scanners. The multi-dimensional cameras further includes one or more pairs of high-resolution 2D global shutter cameras configured to find surface defects and cover a patch of a surface area of the selected automotive component.

In another variant, the controller is further configured to: (i) aggregate each data set that corresponds to a same or different point image of the selected automotive component, and (ii) add color elements to the 3D model based on the images from the one or more multi-dimensional cameras.

In further another variant, the controller is further configured to (i) slice the aggregated data set into one or more multi-view data sets corresponding to an adjacent part of the selected automotive component and analyze the adjacent part, and (ii) subsequently re-aggregate the multi-view data sets.

In some forms, the present disclosure provides for an inspection method of automotive components that includes steps of transporting, on a conveyor structure, a selected automotive component and scanning the selected automotive component with a network of three-dimensional (3D) scanners to obtain a set of data. The network of 3D scanners includes a first group of scanners having a first angle and a first orientation relative to the selected automotive component on the conveyor structure and a second group of scanners having a second angle and a second orientation relative to the selected automotive component on the conveyor structure and different from the first angle and the first orientation. The inspection method further includes steps of collecting images corresponding to the selected automotive component with one or more multi-dimensional cameras, receiving, at a controller communicably coupled to the cameras, the images from the cameras, receiving, at the controller communicably coupled to the network of 3D scanners, the set of data that collectively represent the selected automotive component, each data set corresponding to a point image of the selected automotive component, reconstructing, by the controller, a 3D model of the selected automotive component, determining, by the controller, whether an anomaly is present with respect to the selected automotive component based on a comparison of a reconstructed 3D model and a prestored model associated with the selected automotive component or based on an artificial intelligence based recognition, and generating, by the controller at a production speed, an output indicative of the selected automotive component with or without anomaly.

In another form, upon detection of the anomaly, the inspection method further includes a step of identifying a location of the anomaly at a production speed by mapping to an original component coordinate system of the prestored model.

In one variant, the inspection method further includes the step of identifying a classification of the anomaly via an artificial intelligence classification based training. In another variant, the inspection method further includes the step of determining the first and the second angles and the first and the second orientations based on a set of factors. In another variant, the set of factors includes a size of the selected automotive component, a shape of the selected component, a size of expected defects, a component cycle time, or a combination thereof.

In another form, the inspection method further includes displaying, at a production speed, the output on a user interface screen in response to the anomaly being present, wherein the output is indicative of the location of the anomaly of the selected automotive component.

In at least one variant, the inspection method further includes the step of identifying a type of the selected automotive component based on the reconstructed 3D model.

In another variant, the inspection method further includes the step of identifying the type of the selected automotive component further comprises comparing the 3D model with an original Computer Added Design (CAD) template of the selected automotive component.

In further another variant, the step of identifying the classification of the anomaly further includes steps of aligning estimated inlier anomaly templates, comparing the 3D model with the estimated inlier anomaly templates, and determining whether the 3D model is deviated from the estimated inlier anomaly templates.

In some forms, an inspection method of automotive components includes steps of scanning a selected component and generating a set of data, where each data corresponds to a point image of the scanned selected component, aggregating, by a controller, the set of data and generating a 3D model of the selected component, determining, by the controller, whether anomaly is present based on a comparison of the scanned component with a prestored anomaly template associated with the identified classification or an artificial intelligence based recognition, and displaying, by the controller at a production speed the 3D model of the selected component on a user interface.

In at least one variant, the inspection method further includes the step of generating, at the production speed, an output that prompts or alerts removal of the selected component from a production line.

In another variant, the inspection method further includes, identifying, by the controller, a classification of the scanned selected component and features associated with the classification from the 3D model via an artificial intelligence based training, and upon detection of the anomaly, identifying a type of the anomaly and a location of the anomaly based on a coordinate system of the prestored anomaly template, wherein the anomaly comprises one or more of splits, burrs, scratches, or slug marks.

In further another variant, the inspection method further includes steps of arranging a first group of 3D scanners at a first angle and a first orientation, arranging a second group of 3D scanners at a second angle and a second orientation different from the first angle and the first orientation, collecting a first data set corresponding to first point image of the selected component with the first group of 3D scanners, collecting a second data set corresponding to a second point image of the selected component with the second group of 3D scanners, and aligning the first data set and the second data set prior to reconstructing the 3D model.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
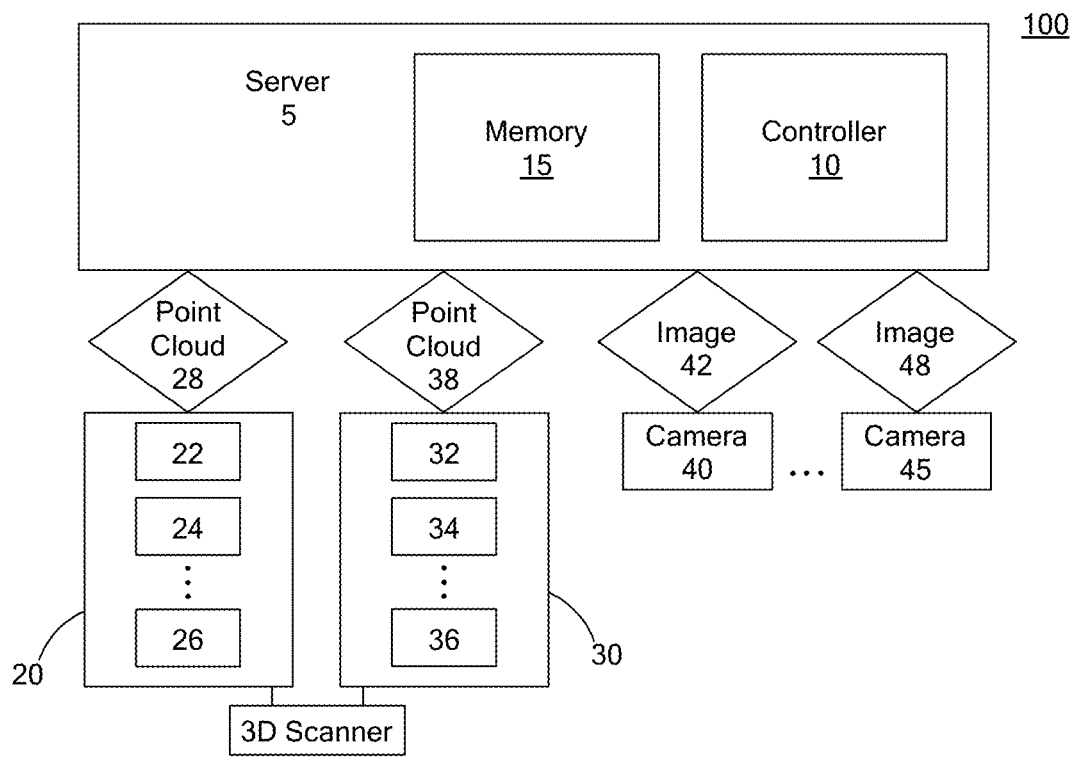
FIG. 1 is a block diagram of a production-speed component inspection system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A production-speed component inspection system (i.e., "component inspection system") and method according to the teachings of the present disclosure can detect defective components at a first process of manufacturing automotive vehicles and thus, can mitigate the effect on downstream processes and ultimately, the final vehicle assembly. As provided herein, the component inspection system/method develops a three-dimensional (3D) model based on a point cloud picture of a component, product, a part of the component or product. Based on the 3D model and an artificial intelligence (AI) based identification and classification, the component inspection system/method may identify and analyze a defect of the component and provide a result at a production rate or production-speed.

The component inspection system/method is implemented with multi-dimensional vision data systems. In some forms, two-dimension (2D) and three-dimension (3D) vision systems are combined to capture component data, compare actual conditions to a prestored model having standard conditions, and feed an AI based analytical model to identify defects on the panel. In one variation, the prestored model may be generated with computer-aided engineering (CAE) based designs.

The component inspection system according to the teachings of the present disclosure may include a collaborative network of 3D scanners to collect data about the entire panel and an array of deep neural networks that takes 3D "point cloud" information, detects anomalies, and identifies their locations substantially in real time. While each can be used independently, for the metal panel defect detection system, the 3D scanners and the neural networks are used together due to the large panel size, unique curvatures/profiles, the size of defects, and required cycle time. In some forms, various 3D scanners can be used with deep neural network software as long as 3D scanners produce a conforming 3D "point cloud."

Referring to FIGS. 1-7, the component inspection system according to the teachings of the present disclosure is described in detail.

FIG. 1 is a block diagram of a component inspection system according to one form of the present disclosure. In one form of the present disclosure, a component inspection system 100 for automotive components includes one or more multi-dimensional cameras 40, 45 and a network of three-dimensional (3D) scanners provided as a first scanner group 20 and a second scanner group 30 (collectively "scanners 20, 30"). The inspection system 100 further includes a server 5 that includes a controller 10 and memory 15. The inspection system 100 operates with a conveyor structure operable to transport the selected automotive component, as will be shown and described in connection with FIG. 7 below.

The network of three-dimensional (3D) scanners 20, 30 are configured to scan a component such as, but not limited to: stamped panels, door opening panels, hoods, and/or fenders. The scanners 20, 30 are configured to scan the component to produce component data (i.e., scanned component data). In some forms, the component data captured by the scanners 20, 30 are provided in the form of a point cloud 28, 38, as will be described more in detail below.

In some forms, component data collectively represent a structure of a selected automotive component. For the purpose of convenience of explanation, the component is described as a front door panel, but the present disclosure is applicable to other components and should not be limited to a front door panel.

In one form, the first scanner group 20 includes scanners 22, 24, 26 that are arranged at a first angle and a first orientation relative to the conveyor structure and the second scanner group 30 includes scanners 32, 34, 36 that are arranged at s second angle and a second orientation relative to the conveyor structure and different from the first angle and the first orientation. In at least one variant, each of scanners 22, 24, 26 may have different angles and orientations. In another variant, each of scanners 32, 34, 36 may have different angles and orientations. The scanners 22, 24, 26 and/or the scanners 32, 34, 36 are operable to scan one or more designated scopes of the selected automotive component such as a front door panel. The angles and orientations along with a number of scanners and their positionings as to the component being scanned can be determined through numerous testing processes. Accordingly, there is no constraint as to a number of scanners, and the positioning and installation details of the scanners are reconfigurable and adjustable based on needs at manufacturing facilities. In addition, the number of scanners to use also depend on the component 500 such as a size of the component 550, an area to be covered, unique shape or profiles of the component 550, etc. An exemplary application of a conveyor structure and imaging system is provided below in relation to FIG. 7.

Figure 2:
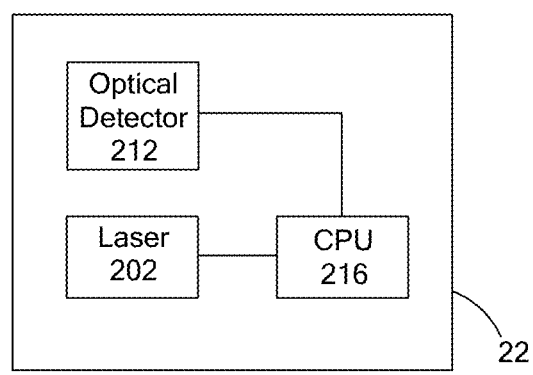
FIG. 2 is a block diagram of a scanner included in the system of FIG. 1.

FIG. 2 is an exemplary block diagram of the scanner 22 of the system 100 and, in one form, the other scanners of the first scanner group 20 and the second scanner group 30 are configured in a similar manner and thus, the description set forth for scanner 22 is also applicable to the other scanners. The scanner 22 is a three-dimensional (3D) scanner that generates a point cloud that is a collection of points corresponding to geometric samples on the surface of an object. These points can be used to reconstruct the shape of an object, such as the component. Accordingly, the scanner 22 generates a 3D model of the scanned component which includes a point cloud of geometric samples on the surface of the selected component.

The scanner 22 performs multiple scans to produce a complete model of the selected automotive component. The scanners 22, along with other scanners in the group 20 and 30, perform multiple scans, from many different directions, in order to obtain information about the entire structure of the selected automotive component. Specifically, the 3D scanners 20, 30 produce a picture or image that is based on the distance to the selected automotive component at each point in the picture. In one form, multiple scans are performed to obtain information about all the surfaces of the component. These scans generate a point cloud 28, 38, which in turn are provided to the server 5 for processing by the controller 10.

As shown in FIG. 2, the scanner 22 includes a laser 202, an optical detector 212 that detects the reflected laser light from the automotive component, and a CPU 216. The CPU 216 determines a travel distance of the light emitted from the laser 202. In one form, the scanner 22 detects the distance of one point on the automotive component and scans one point at a time. The scanner 22 changes its direction for view and scans multiple, different points. In other variants, the scanner 22 may use a 3D scanner known in the art as long as a point cloud is generated.

Figure 3A:
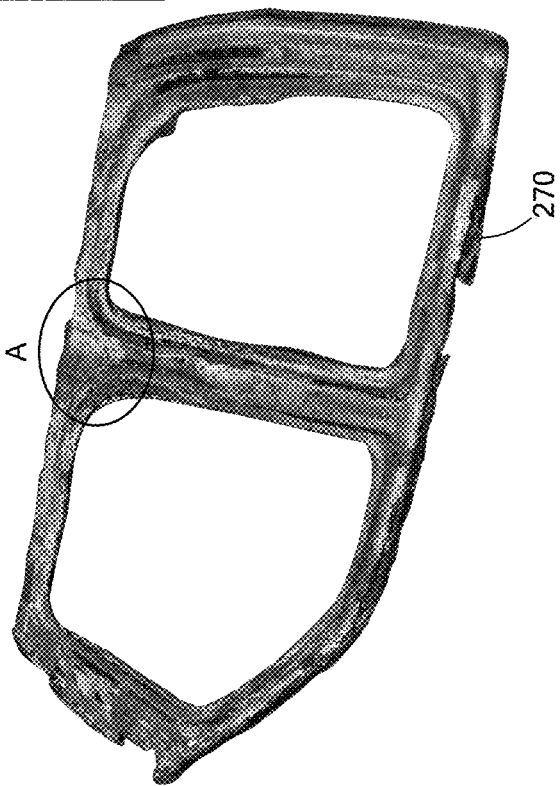
FIG. 3A illustrates one example of a 3D model reconstructed from a point cloud according to the teachings of the present disclosure.
Figure 3B:
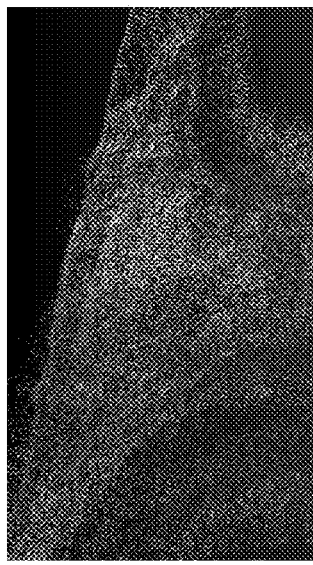
FIG. 3B illustrates an enlarged view of a portion of the 3D model as shown in FIG. 3A.

For explanation purposes, FIGS. 3A and 3B illustrate one example of a 3D point cloud model (i.e., 3D model 270) of a door opening panel formed by data from 3D scanners. A part of the 3D model 270 provided in enclosure A of the door opening panel as shown in FIG. 3A is enlarged in FIG. 3B to illustrate the point cloud in detail. As illustrated above, the point cloud provides a collection of distance information at each point on the surfaces of the selected automotive component.

Referring back to FIG. 1, the multi-dimensional cameras 40, 45 are arranged relative to the network of 3D scanners 20, 30, the conveyor structure, and the component on the conveyor structure. In some forms, the cameras 40, 45 include a 2D digital camera (color cameras and/or monochrome cameras) that capture two dimensional (2D) images 42, 48, which are provided to the server 5, respectively. In one form, the cameras 40, 45 are configured to detect small surface defects in large patches of the surface area as needed. In at least one variation, one or more of the cameras 40, 45 may include a 3D camera. The 3D cameras may capture and produce a 3D image by taking a set of pictures of an object from different angles and converting the set of pictures into a 3D model with appropriate software.

In one form, the cameras 40, 45 may not be used and the 3D scanners 20, 30 are used as a vision system that captures data from the automotive component. In FIG. 1, the two groups of scanners 20, 30 and the two cameras 40, 45 are illustrated for convenience of description and the teachings of the present disclosure are not limited thereto.

Referring back to FIG. 1, in one form, the server 5 is communicatively coupled to scanners 20, 30 and the cameras 40, 45 to receive the point cloud data 28, 38 and the images 42, 48, respectively. In one form, the cameras 40, 45 may provide information regarding the color (e.g., red, blue, green information) of the component.

Figure 4:
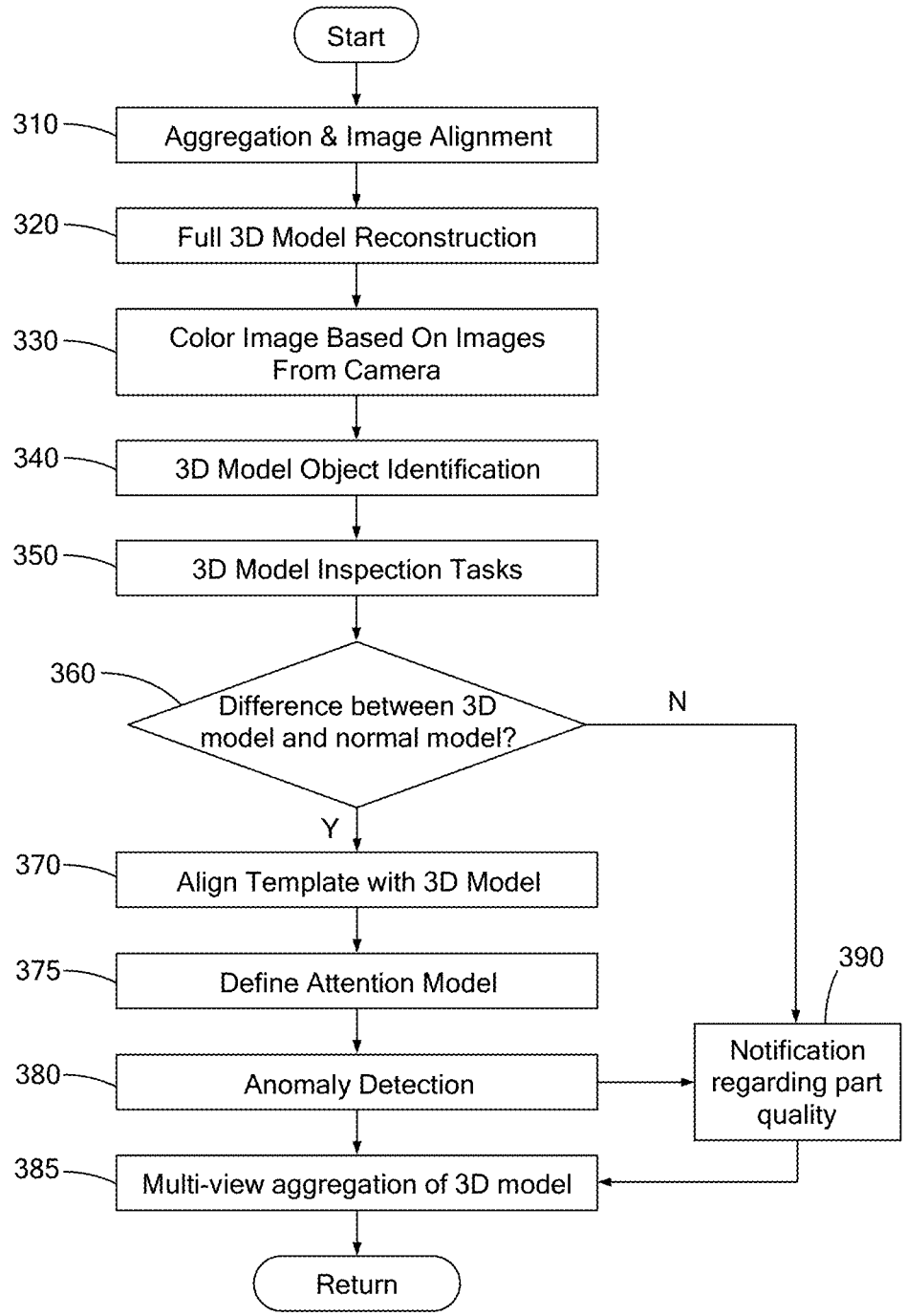
FIG. 4 is a flowchart of a defect-anomaly detection routine according to the teachings of the present disclosure.

The server 5 includes the memory 15 (shown in FIG. 1) for storing instructions to be executable by the controller 10. In some forms, upon execution of the instructions, the controller 10 of the server 5 is configured to perform operations as illustrated in FIG. 4. In some forms, the controller 10 is implemented with an array of deep neural networks that takes 3D point cloud information, detects anomalies, and identifies their locations substantially in real time. By using the deep neural networks and processing the 3D point cloud information, the controller 10 may perform inspection and detection of anomalies even though a panel has a large size and/or unique curvatures or profiles, the size of defects is large, or a required cycle time varies. In other forms, a different type of scanners can be used with or without the deep neural networks as long as such scanners produce a conforming 3D point cloud.

The point cloud 28, 38 and the images 42, 48 captured by the scanners 20, 30 and the cameras 40, 45 are provided to the server 5 as input data. Referring to FIG. 4, an example defect-anomaly detection routine is provided and is performed by the server 5. At 310, scanned information is aggregated and aligned as multiple scans from many different directions have been performed by the groups of scanners 20, 30. Such scanned information is merged to create the 3D model and reconstruct a 3D model of the selected automotive component, such as a front door panel, at 320. The server 5 executes the instruction to add color components from the images 42, 48 captured by the cameras 40, 45 and perform color image background masking, at 330.

In at least one variant, based on the reconstructed 3D model, the server 5 identifies the type of automotive component provided in the 3D model via, for example, an artificial intelligence classification training, at 340. Specifically, the server 5 determines whether the selected automotive component is a door opening panel, a hood, a roof, etc. In one form, the server 5 is trained to learn and identify a front door panel, for example, by using training data that relate to different automotive components. In some forms, a deep neural network is used to identify the panel type such as a front door panel, a rear door panel or other parts that the system is trained to recognize. The deep neural network is of relatively smaller size due to the vastly smaller set of possible outputs. In at least one of variants, the neural network may evaluate the panel type in tens of milliseconds. Alternatively, this identification step at 340 can be omitted and the server 5 can proceed to inspection tasks without identifying the type of automotive component. In other words, the server 5 performs detection of anomalies without identifying the type of automotive component.

The server 5 proceeds to more complex inspection tasks of the front door panel, at 350. In one form, the complex inspection tasks include a number of simpler segmentation tasks such as separating the front door panel from a background corresponding to a conveyor structure, surrounding objects, etc. In at least one variation, the server 5 distinguishes, in the 3D model, features associated with the front door panel over surrounding features unrelated to the panel and isolate, in the 3D model, the distinguished features to acquire a component 3D model of the panel from the surrounding features.

The memory 15 is also configured to store one or more template CAD models of the selected automotive component. These template CAD models correspond to a normal condition of the selected automotive component, i.e., having no anomaly or defect. In some forms, these template CAD models are included in and used as training data that train the server 5. At 360, the server 5 compares the template CAD model with the reconstructed 3D model to determine if there is a difference between the two, such as deviation(s) from the model, in some forms. If there is, the server 5 proceeds to an anomaly detection process provided in steps 370-385.

Once difference(s) between the template CAD model and the 3D model are recognized, different templates relating to different types of anomalies are aligned with respect to the 3D model, at 370. The anomalies of automotive components may include as splits, burrs, scratches, slug marks, etc. In some forms, different types of defects may be classified and templates corresponding to different defects are generated and prestored in the memory of the server 5. For example, one or more templates relating to splits are generated and prestored. Likewise, one or more templates relating to burrs, scratches, slug marks, etc. may be prestored. In some forms, pattern recognition techniques may be used and the server 5 is trained to learn different defects by using training data.

In some forms, anomaly detection templates may include estimated inlier templates that represent normal components or components without a particular defect. For example, with respect to splits type defects, anomaly detection templates represent a component having no splits type of defect. In at least one variant, one or more anomaly detection templates may be generated. In another variant, the anomaly detection templates may include different templates that represent different degrees of a particular type of defect within the range of the normal condition.

In other forms, the server 5 is trained to learn different types of anomalies. The server 5 includes neural networks that learn and recognize different types of defects by training. In some forms, training data for training the server 5 may include the estimated inlier templates. The training data may include outlier models which indicate different types of defects. The training data may include CAD images of components, scanned pictures of components with or without different types of defects and the like. Based on learning by the training data, the server 5 is trained to learn and classify different types of defects. In that case, the server 5 may not perform comparing the template CAD model with the reconstructed 3D model at 360 and recognize a particular defect from the reconstructed 3D model.

Continuing reference to FIG. 4, 3D model of the selected automotive component, reconstructed from the point clouds plus the images, becomes an attention model, at 375. In some forms, the server 5 recognizes a particular type of defect such as splits, burrs, a slug mark, etc., at 380. In one form, the server 5 determines whether the 3D model deviates from the inlier templates and presents to outlier characteristics. Upon determination that the 3D model deviates from the inlier templates, the server 5 classifies the 3D model as a component with a particular defect, at 380.

In some forms, the server 5 compares the attention model with a 3D CAD model and determines whether different types of defects are present. For example, if a 3D model reconstructing a front door panel may have scratches and burrs, the server 5 determines these anomalies by comparing the 3D model with 3D CAD models relevant to scratches and burrs.

In other forms, the server 5 recognizes a particular defect based on the 3D model as the server 5 is trained to perform such recognition with relevant training data such as inlier templates, 3D CAD models, etc.

Different types of defects tend to occur more frequently at particular locations. For instance, splits may occur more frequently at an edge of a door panel. Scratches may occur more frequently at the top of a curved surface, etc. In other forms, the server 5 may apply the anomaly templates in association with locations of the 3D model.

Figure 5:
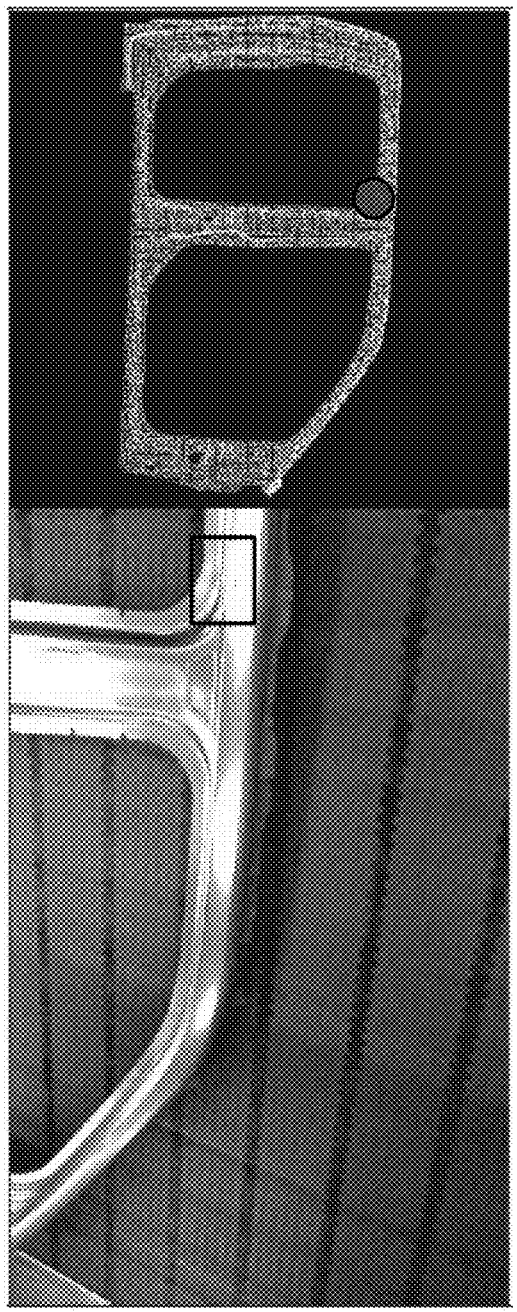
FIG. 5 illustrates mapping of a component having a defect to a corresponding point cloud image.

Once the defect is identified, the original 3D model template is used to identify the exact (x, y, z) anomaly centroid location in millimeters relative to the selected origin. The detected anomaly is to be mapped back to the original panel coordinate system. The anomalies may also be classified as splits, burrs, scratches, slug marks, etc. As shown in FIG. 5, a defect appears at one location of the door panel and the location of this defect is mapped to the original panel coordinate system by using the original 3D model template that appears in the right side of FIG. 5.

The server 5 eventually generates, at a production speed, an output indicative of the selected automotive component with or without anomaly, at 390. More particularly, at 360, if no difference or deviation is detected, the server 5 issues a notification indicating the component is fine (e.g., text on a screen, green screen with or without text, among other indicators). Once the anomaly is determined at 380, the server 5 may issue notification identifying the anomaly, providing an image of the model with estimated position of anomaly, or other suitable notification. In lieu of or in addition to the notification provided after step 380, the server 5, may indicate at 370 that a difference has been detected. Thus, the notification of the defect/anomaly can be provided at any point after 360. Notification can be provided on one or more user displays, examples of which are provided below.

In one form, all computations by the server 5 take approximately less than 10 seconds, and more particular, less than 3 seconds. These computation times can accommodate production speed. By way of example only, a typical cycle time is about 3.5 seconds and the conveyor structure typically moves panels from the end of the line at roughly 0.6 meter per second. Based on this information, production speed computations indicate that data from a panel on the conveyor structure are collected and analyzed, and a result is displayed in less than 10 seconds. This time constraint can be met with the inspection system according to the teachings of the present disclosure. The computation speed of the inspection system 100, particularly at the server 5, is 10 seconds or less by way of example.

Referring back to FIG. 4, at 385, a multi-view aggregation takes place with respect to an adjacent part of the selected automotive component in order to analyze the adjacent part. More specifically, the 3D model is sliced into one or more multi-view data sets for the adjacent part of the selected automotive component as different scanners may provide overlapping views for the adjacent part. Additionally, the adjacent part may have a curved shape, be prone to more defects due to bumping, contacting, etc., and therefore, more detailed inspection may be desirable. After slicing the aggregated data set into one or more multi-views, the server 5 subsequently re-aggregate the multi-views into the 3D model, at 385. Data generated by the server 5 may be employed to further improve the operation of the server 5 and in one form, can be stored in a database (not shown) that may be separate from the server 5.

Figure 6:
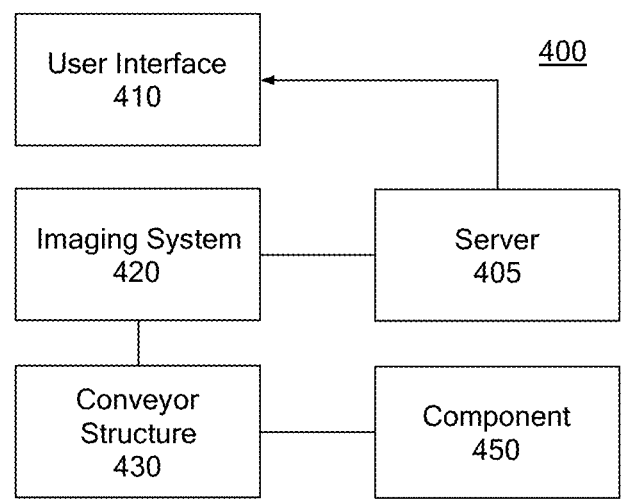
FIG. 6 is a block diagram of another form of a component inspection system.

FIG. 6 is a block diagram of another form of a component inspection system 400. In FIG. 6, the component inspection system 400 includes a server 405, a user interface 410 and an imaging system 420. A component 450 is transported at a certain speed on a conveyor structure 430. The component inspection system 400 is arranged adjacent to the conveyor structure 430 and collects component data from the component 450 while the component 450 is moving on the conveyor structure 430. In some forms, the user interface 410 is a display that is easily accessible or visible to operators working at the conveyor structure 430. This allows operators to check the component 450 on the user interface 410 and scrap the component 450 off from the conveyor structure 430 if the user interface 410 indicates anomaly including a defect. Additionally or alternatively, the user interface 410 includes an audio speaker that produces a notification signal or an alarm.

The server 405 operates to process and analyze the data collected by and transmitted from the imaging system 420. In some forms, the operations of the server 5 as discussed above can be referred to with respect to operations of the server 405. In some forms, the structures and operations of the server 405 and the imaging system 420 are identical or similar to those of the inspection system 100. In other forms, the server 405 may not include neural networks and use conventional CPUs without neural networks. In another form, the imaging system 420 may not include 3D scanners and be implemented with multi-dimensional cameras. In further another form, the imaging system 420 may include 3D scanners without 2D cameras.

In order for an operator to scrap a component with a defect from the conveyor structure 430, computation times by the server 450 may correspond to the time that the component 450 reaches the end of the line of the conveyor structure 430. The server 450 is arranged in a network proximity to the conveyor structure 430 in order to prevent a potential network delay or buffering. In some forms, the server 450 and the imaging system 420 are arranged to be physically close to the conveyor structure 430 but the teachings of the present disclosure are not limited thereto.

Figure 7:
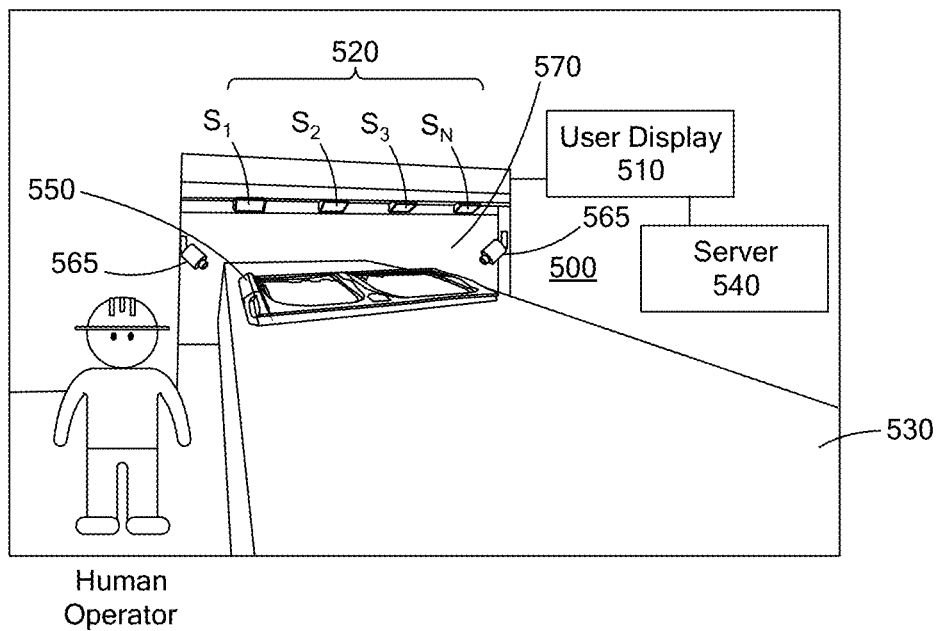
FIG. 7 is a perspective view of the component inspection system of FIG. 1.

FIG. 7 is a perspective view of one form of implementing the component inspection system 400 of FIG. 6 in an actual manufacturing site. A user display 510 is arranged or secured to be adjacent to a conveyor structure 530 where a component 550 is being transported. A human operator can easily view information displayed on the user display 510. The user display 510 is coupled to a server 540 which transmits a display of the component 550 with anomaly if any. When the human operator checks the anomaly from the user display 510, the human operator can remove the component 550 from the conveyor structure 530. When the component 550 is fed to the conveyor structure 530, an imaging system 520 including a plurality of scanners S1, S2, S3 . . . , $S_N$ and cameras 560, 565 arranged at the top of an opening 570 and the side of the opening 570, respectively. The orientations and angles of each scanner may differ based on various factors. The imaging system 520 illustrated in FIG. 7 is by way of example only and the orientations and the angles of each scanner along with a number of scanners 520 and a number of cameras 560, 565 may not be limited thereto.

A component inspection system and method according to the teachings of the present disclosure provides an automatic inspection system that flags possible defected components at high production speed. The component inspection system improves quality of the inspection by removing the variability of manual inspection. These and other advantages related can be realized by the component inspection system/method of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An inspection system for automotive components comprising:
    one or more multi-dimensional cameras configured to collect images corresponding to a selected automotive component;
    a network of three-dimensional (3D) scanners configured to scan the selected automotive component;
    a conveyor structure operable to transport the selected automotive component; and
    a controller communicably coupled to the cameras and the network of 3D scanners to receive the images from the cameras and receive a data set that collectively represent the structure of the selected automotive component from the network of 3D scanners, wherein each data of the data set corresponds to a point image of the selected automotive component,
    wherein the network of 3D scanners comprises a first group of scanners having a first angle and a first orientation relative to the conveyor structure and a second group of scanners having a second angle and a second orientation relative to the conveyor structure and different from the first angle and the first orientation, and within each group;
    wherein the multi-dimensional cameras are arranged relative to the network of 3D scanners, the conveyor structure, and the selected automotive component;
    wherein the controller is configured to:
    reconstruct a 3D model of the selected automotive component based on the image data from the cameras and the data set from the network of 3D scanners;
    determine whether an anomaly is present with respect to the selected automotive component based on an artificial intelligence based recognition; and
    generate, at a production speed, an output indicative of the selected automotive component with or without anomaly.

2. The inspection system of claim 1, wherein the controller is further configured to:
    identify, in the 3D model, the selected automotive component via an artificial intelligence classification;
    determine whether the anomaly is present with respect to the selected automotive component based on a comparison of the reconstructed 3D model of the selected automotive component with a prestored model associated with the selected automotive component;
    distinguish, in the 3D model, features associated with the selected automotive component over surrounding features unrelated to the selected automotive component; and
    isolate, in the 3D model, the distinguished features to acquire a component 3D model of the selected automotive component from the surrounding features.

3. The inspection system of claim 1, wherein the controller is further configured to, upon detection of the anomaly, identify a location of the anomaly at the production speed by mapping to an original component coordinate system of the prestored model.

4. The inspection system of claim 3, wherein the controller is further configured to:

slice the aggregated data set into one or more multi-view data sets corresponding to an adjacent part of the selected automotive component and analyze the adjacent part; and subsequently re-aggregate the multi-view data sets.

5. The inspection system of claim 1, wherein the controller is further configured to identify a classification of the anomaly via an artificial intelligence based training.

6. The inspection system of claim 1, wherein the 3D scanners are automatically synchronized within microseconds, and after a geometric calibration of extrinsic parameters of the network of the 3D scanners, the controller receives the data set from the 3D scanners.

7. The inspection system of claim 6, wherein the controller is further configured to display the selected automotive component having anomaly with a location of the anomaly on a user interface at the production speed.

8. The inspection system of claim 1, wherein the controller is further configured to:
aggregate each data set that corresponds to a same or different point image of the selected automotive component; and
add color elements to the 3D model based on the images from the one or more multi-dimensional cameras.

9. An inspection method of automotive components, the method comprising:
transporting, on a conveyor structure, a selected automotive component;
scanning the selected automotive component with a network of three-dimensional (3D) scanners to obtain a set of data, wherein
the network of 3D scanners comprises a first group of scanners having a first angle and a first orientation relative to the selected automotive component on the conveyor structure and a second group of scanners having a second angle and a second orientation relative to the selected automotive component on the conveyor structure and different from the first angle and the first orientation
collecting images corresponding to the selected automotive component with one or more multi-dimensional cameras;
receiving, at a controller communicably coupled to the cameras, the images from the cameras;
receiving, at the controller communicably coupled to the network of 3D scanners, the set of data that collectively represent the selected automotive component, each data set corresponding to a point image of the selected automotive component;

reconstructing, by the controller, a 3D model of the selected automotive component;
determining, by the controller, whether an anomaly is present with respect to the selected automotive component based on an artificial intelligence based recognition; and
generating, by the controller at a production speed, an output indicative of the selected automotive component with or without anomaly.

10. The inspection method of claim 9 further comprising, upon detection of the anomaly, identifying a location of the anomaly at a production speed by mapping to an original component coordinate system of the prestored model.

11. The inspection method of claim 10 further comprising displaying, at a production speed, the output on a user interface screen in response to the anomaly being present, wherein the output is indicative of the location of the anomaly of the selected automotive component.

12. The inspection method of claim 9 further comprising identifying a classification of the anomaly via an artificial intelligence classification based training.

13. The inspection method of claim 12, wherein: determining whether an anomaly is present with respect to the selected automotive component further comprises determining whether the anomaly is present with respect to the selected automotive component based on a comparison of a reconstructed 3D model and a prestored model associated with the selected automotive component; and
identifying the classification of the anomaly further comprises:
aligning estimated inlier anomaly templates;
comparing the 3D model with the estimated inlier anomaly templates; and
determining whether the 3D model is deviated from the estimated inlier anomaly templates.

14. The inspection system of claim 9, wherein generating the output further comprises displaying the selected automotive component having anomaly with a location of the anomaly on a user interface at the production speed.

15. The inspection method of claim 9, further comprising identifying a type of the selected automotive component based on the reconstructed 3D model.

16. The inspection method of claim 15, wherein identifying the type of the selected automotive component further comprises comparing the 3D model with an original Computer Added Design (CAD) template of the selected automotive component.

* * * * *